United States Patent
Sagy et al.

(10) Patent No.: US 9,703,869 B2
(45) Date of Patent: Jul. 11, 2017

(54) STREAM RECOGNITION AND FILTERING

(71) Applicant: GLOBAL FILE SYSTEMS HOLDINGS, LLC

(72) Inventors: Ravid Sagy, Beit Yitzhack (IL); Norberto Meijome, Bexley North (AU)

(73) Assignee: Global File Systems Holdings, LLC, Sherman Oaks, CA (US)

( * ) Notice: Subject to any disclaimer, the term of this patent is extended or adjusted under 35 U.S.C. 154(b) by 74 days.

(21) Appl. No.: 14/452,465

(22) Filed: Aug. 5, 2014

(65) Prior Publication Data
US 2014/0351280 A1    Nov. 27, 2014

Related U.S. Application Data

(63) Continuation of application No. PCT/US2013/026264, filed on Feb. 15, 2013.
(Continued)

(51) Int. Cl.
*G06F 17/30* (2006.01)
*H04N 21/835* (2011.01)
(Continued)

(52) U.S. Cl.
CPC .. *G06F 17/30864* (2013.01); *G06F 17/30861* (2013.01); *H04L 65/60* (2013.01); *H04L 67/1095* (2013.01); *H04N 21/835* (2013.01)

(58) Field of Classification Search
USPC ............... 707/607, 609, 687, 705, 790, 821
See application file for complete search history.

(56) References Cited

U.S. PATENT DOCUMENTS

| | | | |
|---|---|---|---|
| 4,658,093 A | 4/1987 | Hellman | |
| 5,649,196 A | 7/1997 | Woodhill et al. | |

(Continued)

FOREIGN PATENT DOCUMENTS

| | | |
|---|---|---|
| JP | H10-224736 | 8/1998 |
| JP | 2002189823 A | 7/2002 |

(Continued)

OTHER PUBLICATIONS

International Search Report and Written Opinion, WIPO, mailed Apr. 23, 2013 in PCT/US2013/026264.
(Continued)

*Primary Examiner* — Sana Al Hashemi
(74) *Attorney, Agent, or Firm* — Siritzky Law, PLLC

(57) ABSTRACT

A method obtains a first data item signature for a first data item, the first data item signature comprising an association between a plurality of synch points in the first data item and a corresponding plurality of block signatures. The process attempts to find one of the plurality of synch points in a second data item; and, if such a synch point is found, then a block signature of a corresponding block of bits in the second data item is determined by applying a hash function to the corresponding block of bits in the second data item. The process ascertains whether the synch point and corresponding block signature from the second data item correspond to a synch point and block signature in the first data item signature. If a predetermined number of synch points and corresponding block signatures match, the first and second data items are considered to match.

20 Claims, 12 Drawing Sheets

Related U.S. Application Data

(60) Provisional application No. 61/604,859, filed on Feb. 29, 2012, provisional application No. 61/607,021, filed on Mar. 6, 2012.

(51) Int. Cl.
  *H04L 29/06* (2006.01)
  *H04L 29/08* (2006.01)

(56) References Cited

U.S. PATENT DOCUMENTS

| | | |
|---|---|---|
| 5,978,791 A | 11/1999 | Farber et al. |
| 6,415,280 B1 | 7/2002 | Farber et al. |
| 6,574,657 B1 | 6/2003 | Dickinson |
| 6,717,694 B1* | 4/2004 | Fukunaga .......... H04N 1/00278 358/1.15 |
| 6,738,799 B2 | 5/2004 | Dickenson |
| 6,928,442 B2 | 8/2005 | Farber et al. |
| 7,373,520 B1 | 5/2008 | Borthakur et al. |
| 7,519,726 B2 | 4/2009 | Palliyil et al. |
| 7,627,641 B2 | 12/2009 | Aslop et al. |
| 7,802,310 B2 | 9/2010 | Farber et al. |
| 7,925,708 B2 | 4/2011 | Davis et al. |
| 7,945,539 B2 | 5/2011 | Farber et al. |
| 7,945,544 B2 | 5/2011 | Farber et al. |
| 7,949,662 B2 | 5/2011 | Farber et al. |
| 8,001,096 B2 | 8/2011 | Farber et al. |
| 8,024,306 B2 | 9/2011 | Palliyil et al. |
| 8,082,262 B2 | 12/2011 | Farber et al. |
| 8,099,420 B2 | 1/2012 | Farber et al. |
| 8,271,403 B2 | 9/2012 | Rieck |
| 8,325,276 B2 | 12/2012 | Ozawa et al. |
| 8,572,190 B2 | 10/2013 | Alsop et al. |
| 8,838,594 B2 | 9/2014 | Fukuda |
| 9,419,801 B2 | 8/2016 | Ackerman et al. |
| 2003/0200207 A1 | 10/2003 | Dickinson |
| 2004/0193880 A1 | 9/2004 | Walmsley |
| 2005/0010792 A1 | 1/2005 | Carpentier et al. |
| 2005/0131900 A1* | 6/2005 | Palliyll ............ H04L 67/2819 |
| 2006/0187358 A1 | 8/2006 | Lienhart |
| 2007/0214220 A1 | 9/2007 | Alsop |
| 2008/0162577 A1 | 7/2008 | Fukuda |
| 2009/0024555 A1 | 1/2009 | Rieck |
| 2009/0109840 A1 | 4/2009 | Hallse et al. |
| 2009/0310776 A1 | 12/2009 | Kanemitsu |
| 2010/0077052 A1 | 3/2010 | Alsop |
| 2010/0274848 A1 | 10/2010 | Altmaier et al. |
| 2010/0290667 A1 | 11/2010 | Lienhart |
| 2010/0293142 A1 | 11/2010 | Ackerman et al. |
| 2011/0020995 A1* | 1/2011 | Akahori ............ H01L 27/115 438/289 |
| 2011/0050995 A1* | 3/2011 | Ozawa ................ H04H 20/18 348/468 |
| 2012/0063636 A1 | 3/2012 | Lienhart |
| 2013/0108173 A1 | 5/2013 | Lienhart |
| 2014/0133695 A1 | 5/2014 | Lienhart |

FOREIGN PATENT DOCUMENTS

| | | |
|---|---|---|
| JP | 2004234641 | 8/2004 |
| JP | 2008166914 | 7/2008 |
| JP | 2009523270 | 6/2009 |
| JP | 2009-151798 A | 7/2009 |
| JP | 2009-302887 | 12/2009 |
| JP | 2010-256951 A | 11/2010 |
| JP | 2011-039776 A | 2/2011 |
| TW | 200922333 A | 5/2009 |
| TW | 200947976 A | 11/2009 |
| WO | WO 0067119 | 11/2000 |
| WO | WO 2007101324 | 9/2007 |

OTHER PUBLICATIONS

Schneier B: "One-Way Hash Functions", Dr. Dobb's Journal, M&T Publ., Redwood City, CA, US, vol. 16, No. 9, Sep. 1, 1991 (Sep. 1, 1991), pp. 148-151, XP002044823, ISSN: 1044-789X.

EPO, Communication regarding the transmission of the European search report for EP2820564, Oct. 26, 2015 [1 pg.].

EPO, European search opinion for EP2820564, Oct. 26, 2015 [9 pgs.].

EPO, Supplementary European search report for EP2820564, Oct. 26, 2015 [3 pgs.].

Official Letter for Taiwan patent application No. 102106683 from Taiwan Intellectual Property Office, May 20, 2016 (including English language translation).

Search Report of Taiwan Patent Application No. 102106683 (from Taiwan Intellectual Property Office, May 11, 2016).

Japan Patent Office, Notice of Reasons for Rejection of Japanese App. No. 2014-559914, May 10, 2016, including English language translation.

Ramaswamy et al., "Video authentication for H.264/AVC using digital signature standard and secure hash algorithm." In Proceedings of the 2006 international workshop on Network and operating systems support for digital audio and video (NOSSDAV '06). ACM, New York, NY, USA, Article 21, 6 pages.

First Office Action, Jul. 5, 2016, Chinese Patent Application No. 201380011606.9, State Intellectual Property Office of the People's Republic of China (including English language translation).

Search Report, Jul. 5, 2016, Chinese Patent Application No. 201380011606.9, State Intellectual Property Office of the People's Republic of China (including English language translation).

JPO (Japan Patent Office), Official Action, Notification of Reasons for Refusal, Japanese Patent. Application No. 2014-559914, Feb. 6, 2017 (in Japanese with English translation by machine).

International Preliminary Report on Patentability, WIPO, mailed Sep. 2, 2014 in PCT/US2013/026264.

International Search Report and Written Opinion mailed Apr. 23, 2013 in PCT/US2013/026264.

Office Action (dated May 18, 2017) from the State Intellectual Property Office of the People's Republic of China (Chinese Patent Office) for Chinese application No. 201380011606.9 (in Chinese with English translation).

\* cited by examiner

Fig. 1(c)

| 102 STREAM SIGNATURE ||
|---|---|
| SYNCH. POINT | BLOCK SIGNATURE |
| $SP_1$ | $H(B_1)$ |
| $SP_2$ | $H(B_2)$ |
| $SP_3$ | $H(B_3)$ |
|  |  |
| $SP_i$ | $H(B_i)$ |

300

| STREAM ID. | STREAM SIGNATURE |
|---|---|
| STREAM S1 | STREAM S1 SIGNATURE |
| STREAM S2 | STREAM S2 SIGNATURE |
| ... | ... |
| STREAM Sk | STREAM Sk SIGNATURE |

| SYNCH. POINT | SIGNATURE |
|---|---|
| $SP_1$ | $H(B_1)$ |
| $SP_2$ | $H(B_2)$ |
| $SP_3$ | $H(B_3)$ |
| ... | ... |
| $SP_i$ | $H(B_i)$ |

| STREAM ID. | STREAM SIGNATURE |
|---|---|
| STREAM Sp | STREAM Sp SIGNATURE CHECK |
| STREAM Sq | STREAM Sq SIGNATURE CHECK |
| ... | ... |
| STREAM Sr | STREAM Sr SIGNATURE |

| |
|---|
| $SP_1$ MATCH |
| $SP_2$ MATCH |
| $SP_3$ MATCH |
| |
| $SP_I$ MATCH |

*Fig. 3(b)*

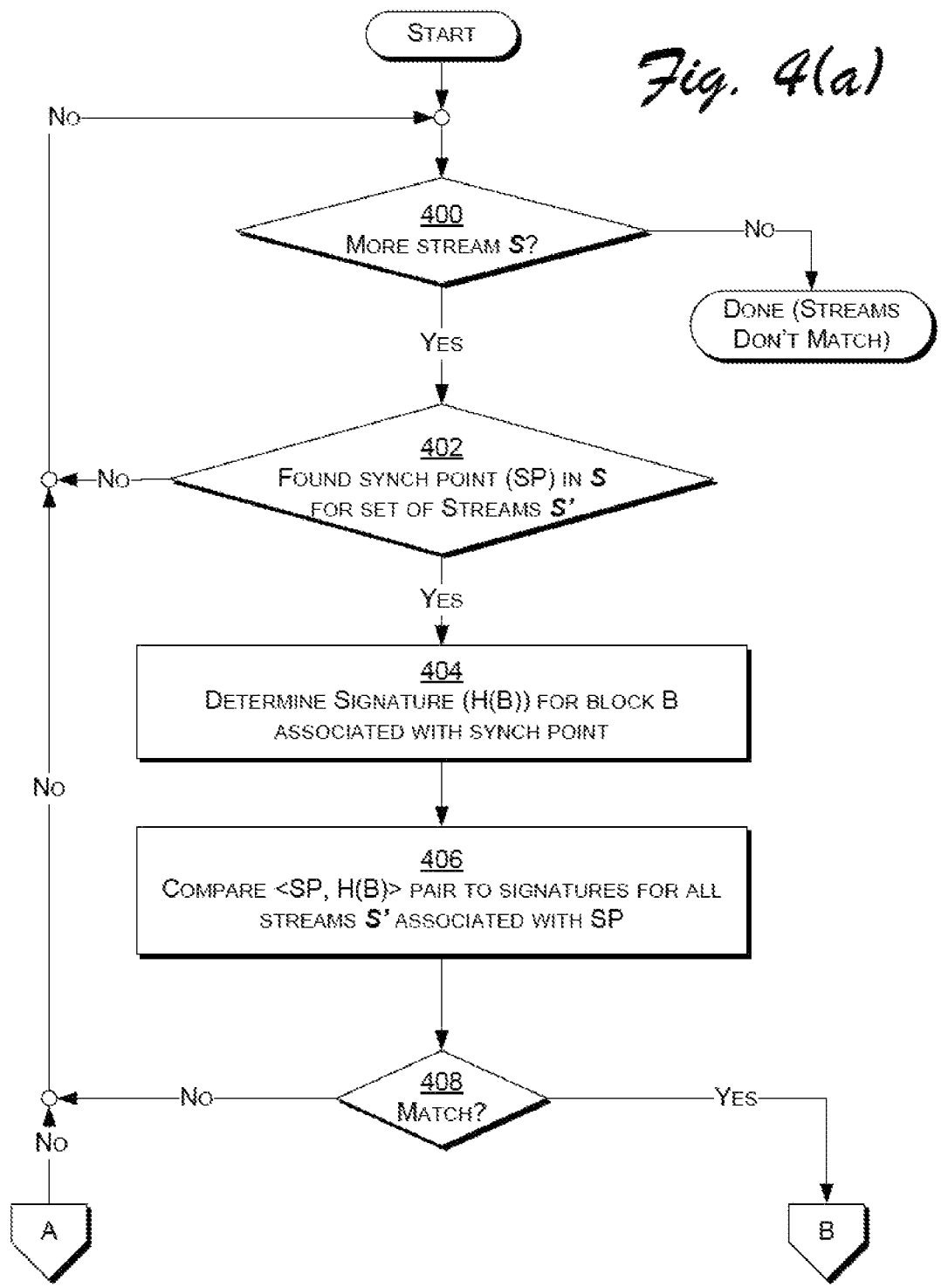

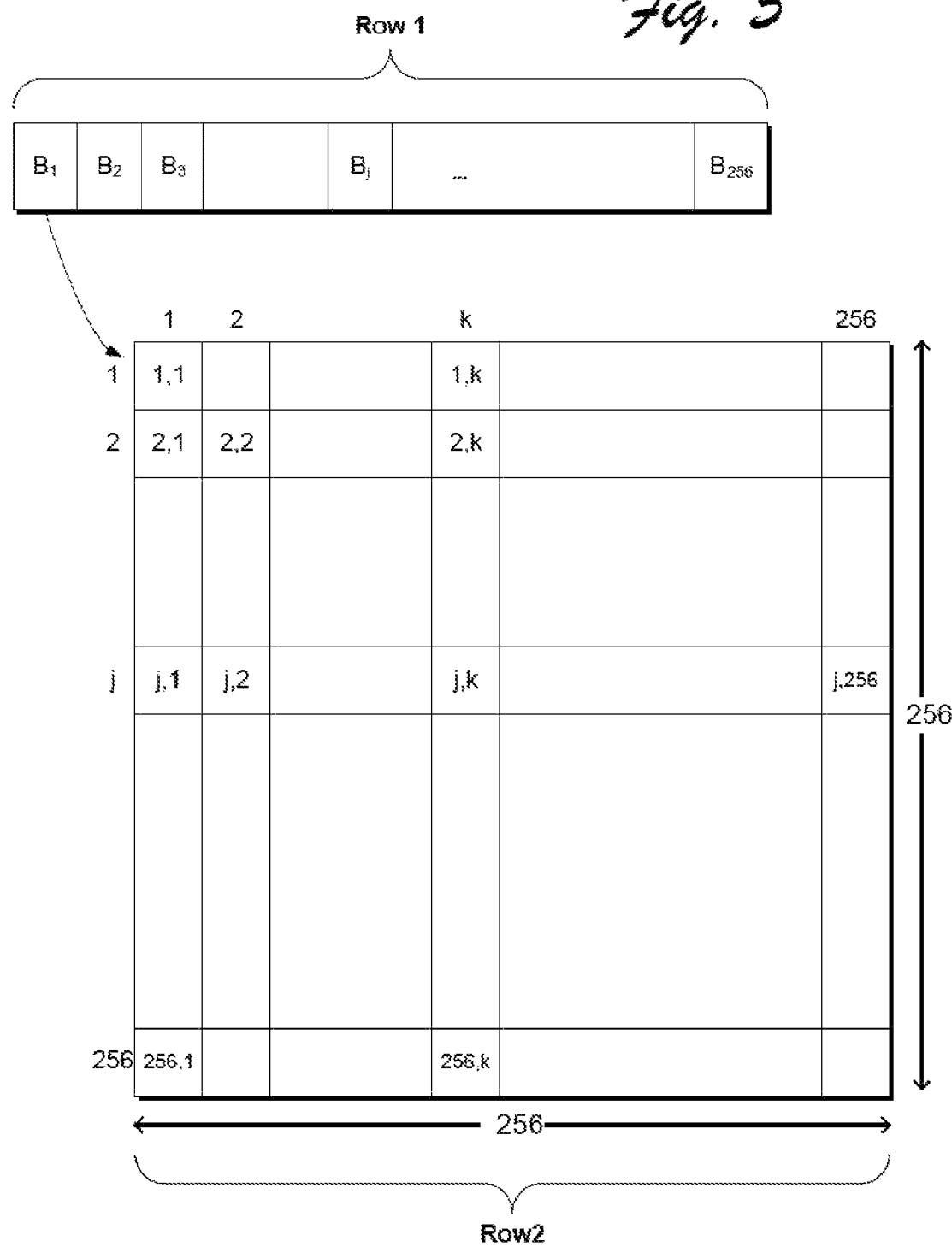

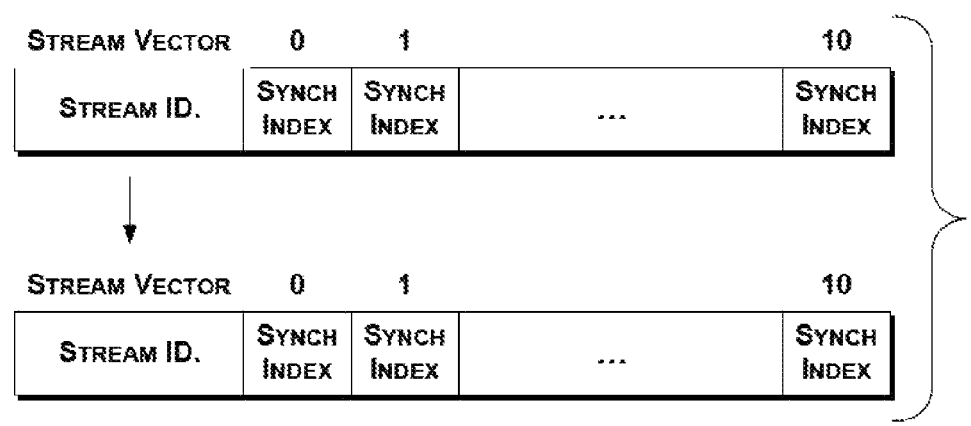
Fig. 6(b)
Fig. 6(c)
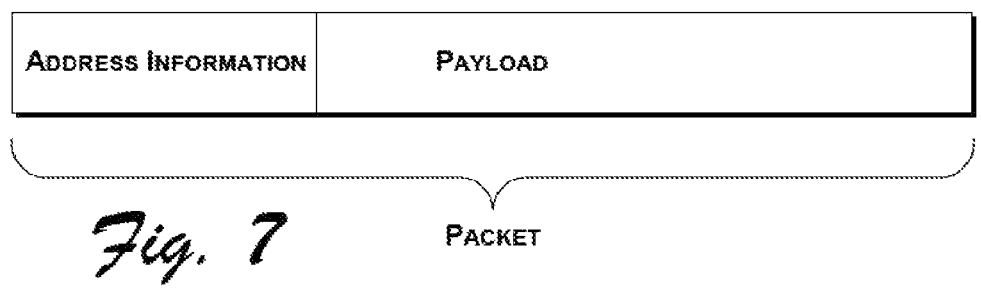
Fig. 7

STREAM RECOGNITION AND FILTERING

RELATED APPLICATIONS

This application is a continuation of application PCT/US2013/026264, filed Feb. 15, 2013, titled "Stream Recognition and Filtering," the entire contents of which are hereby fully incorporated herein by reference for all purposes. Application PCT/US2013/026264 claimed priority from U.S. Provisional Application No. 61/604,859, filed Feb. 29, 2012 and U.S. Provisional Application No. 61/607,021, filed Mar. 6, 2012, the entire contents of both of which are hereby fully incorporated herein by reference for all purposes.

COPYRIGHT STATEMENT

This patent document contains material subject to copyright protection. The copyright owner has no objection to the reproduction of this patent document or any related materials in the files of the U.S. Pat. and Trademark Office, but otherwise reserves all copyrights whatsoever.

BACKGROUND OF THE INVENTION

Field of the Invention

This invention relates to stream recognition and filtering.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 1(c) depicts a stream signature for the data stream of FIG. 1(A);

FIG. 3(a)-3(b) show structures used to process multiple streams;

FIGS. 4(a)-4(b) depict the processing of multiple streams;

FIG. 5 shows exemplary data structures for processing streams;

FIGS. 6(a)-6(c) show an example stream processed using the data structures of FIG. 5;

FIG. 7 shows a typical packet; and

DETAILED DESCRIPTION OF THE PRESENTLY PREFERRED EXEMPLARY EMBODIMENTS

Background and Overview

It is often useful and desirable to examine data being stored on devices or transmitted between devices in order to try to determine whether or not the data correspond to other, known, data. For example, it may be useful or desirable to determine whether data stored on a device corresponds to or is a full or partial copy of other data. As another example, it may be useful or desirable to determine whether a data stream being sent between two devices corresponds to (or is a full or partial copy of) other data.

Description

A data stream (or stream) comprises a sequence of bits. The sequence of bits in a stream may represent or encode some kind of data item (e.g., a movie or an image or music, a data base, etc.). The sequence of bits in a stream may be encrypted and/or compressed. Those of skill in the art will realize and understand, upon reading this description, that the invention is not limited by what the underlying sequence of bits represent.

As used herein, data refers to any arbitrary data, regardless of what the underlying data represent and regardless of how the underlying data are formatted, encoded or stored.

Figure 1A:
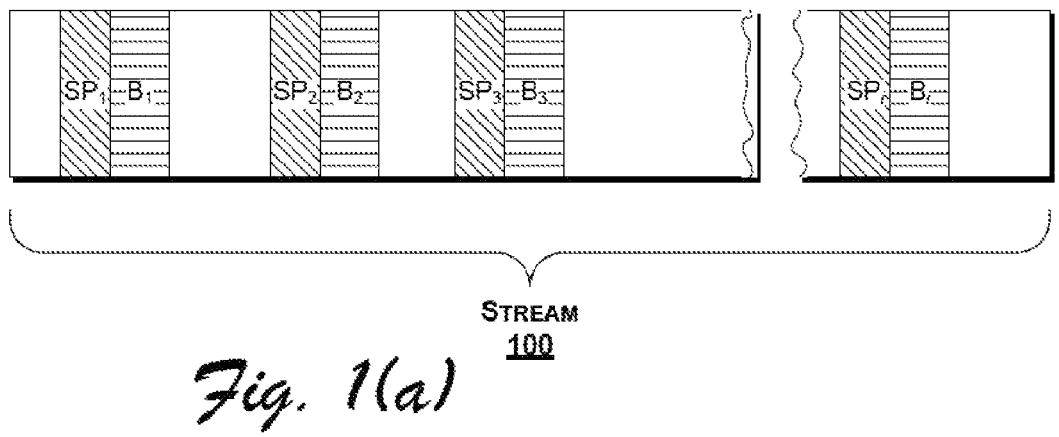
FIG. 1(a) depicts a data stream.
Figure 1B:
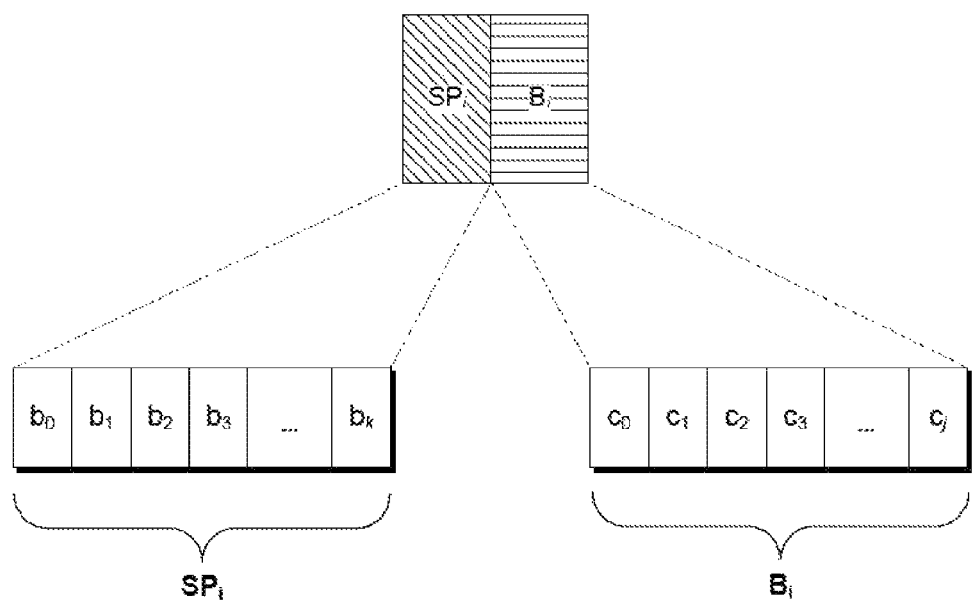
FIG. 1(b) depicts a synch point and a corresponding block of bits.

With reference to FIGS. 1(a)-1(b), a stream 100 includes a plurality of synch points (in the drawing the stream is shown with i synch points, denoted $SP_1$, $SP_2$, $SP_3$, . . . , $SP_i$, collectively referred to as $SP_j$). Following each synch point in the stream is a block of bits (the j-th block being denoted $B_j$ in the drawing).

As shown in FIG. 1(b), the i-th synch point ($SP_i$) consists of k bits ($b_0 b_1 \ldots b_k$), and the i-th block of bits ($B_i$) consists of j bits ($c_0 c_1 \ldots c_j$).

While the j-th block of bits is shown in the drawing as immediately following the j-th synch point, it should be apparent that the j-th block of bits may be separated from the j-th synch point by some known amount.

In a presently preferred implementation there are sixteen (16) synch points, each consisting of 32 bits, and each block of bits consists of 256 bytes. In another implementation there are ten (10) synch points, each consisting of 64 bits, and each block of bits consists of 256 bytes. As used herein, the number of bits in a stream is referred to as the size of the stream, the number of bits in a synch point is referred to as the size of the synch point and the number of bits in a block of bits is referred to as the size of the block of bits. Those of skill in the art will realize and understand, upon reading this description, that different and/or other numbers of synch points may be used than the number shown above, that a synch point may have a different size than that shown above, and that the block of bits may have a different size that the number shown above.

Those of skill in the art will realize and understand, upon reading this description, that the number of synch points may, in some cases, be determined as a function of the size of the stream of bits.

Corresponding to each block of bits $B_j$, is a value $H_j$ determined by applying a function (h) to the block of bits, so that:

$$H_j = h(B_j)$$

The value $H_j$ is also referred to herein as the block signature for the j-th block of bits.

The function h should have the following property: for any two arbitrary blocks of bits, $B_a$ and $B_b$, if $B_a$ is equal to $B_b$ then $h(B_a) = h(B_b)$.

Other desirably properties for the function h include:

(a) a small change in $B_i$ is likely to result in a different value of $h(B_i)$;

(b) the function h is relatively easy and quick to compute;

The function h may be any hash function. In some implementations a message digest function such as MD5 or SHA-1 or the like may be used, although preferably a simpler and more lightweight function may be used. Preferably the hash function produces a 32-bit value.

Those of skill in the art will realize and understand, upon reading this description, that the function h need not (and likely will not) produce a unique value for every block of bits.

Each stream has a corresponding stream signature. With reference now to FIGS. 1(a)-1(c), the signature of a stream with i synch points ($SP_1$, $SP_2$, $SP_3$, . . . , $SP_i$) consists of the i pairs <$SP_j$,$h(B_j)$>, for j=1 . . . i. The diagram in FIG. 1(c) shows a logical representation of the signature 102 of the stream 100 of FIG. 1(a).

Figure 2A:
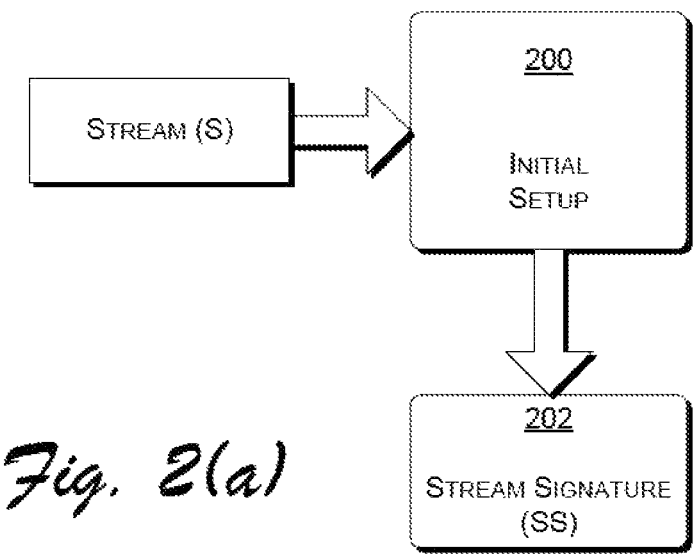
FIG. 2(a)-2(d) depict processing of data streams.

Creation of a stream signature for a data stream is described with reference to FIGS. 2(a) and 2(b). As shown in FIG. 2(a), a stream S is processed by an initial setup 200 to produce a stream signature 202. The processing by the initial setup 200 is described in greater detail with reference to the flowchart in FIG. 2(b). The initial setup process 200 will create a stream signature 202 consisting of a number (k) pairs <$SP_j$,$h(B_j)$>, for j=1 . . . k, for some value of k. The value of k is preferably preset (e.g., 10, 15, 20, etc.), though, as noted above, the value of k may also be determined as a function of the size of the stream S.

In processing the stream 200, the initial setup 202 may first determine the size of the stream S (at 204). This size information may be used, e.g., to determine the number (k) of synch points needed for this stream and/or the separation of synch points within the stream. As will become apparent upon reading this description, for any given stream (S), it is preferable to have the synch points distributed across the entire stream (S).

The process 202 then (at 206) determines the next (i-th) synch point ($SP_i$) in the stream S, and the corresponding block of bits ($B_i$). The value $H(B_i)$ is determined for block of bits $B_i$ (at 208), and the pair <$SP_j$, $H(B_j)$> is stored in the signature for the stream S (at 210). The function "H" computed at 208 corresponds to the function h described above and is preferably a message digest of hash function such as MD5 or SHA or the like.

The process 202 then determines if sufficient <synch point, value> pairs have been determined for this stream S (at 212). If so, the stream's signature (SS) is stored (at 214), otherwise the another synch point is determined (at 206). At the end of processing a stream (S), a stream signature (e.g., of the form shown in FIG. 1(c)) is produced and stored in association with the stream S).

As will be apparent to those of skill in the art, upon reading this description, the fact that two streams have identical stream signatures (as determined using the process described herein) does not necessarily imply that the two streams are identical. For example, a first stream may consist of millions of bits, while a stream signature may consist of only ten or twenty <synch point, block of bit value> pairs, where the synch points are randomly distributed across the stream and wherein each synch point uses only 128 bits and each block of bits uses only 512 bits. In this case, if a second stream has exactly the same <synch point, block of bit value> pairs then it may correspond to the first stream, but it may not. However, if the second stream does not have the same <synch point, block of bit value> pairs as the first stream then it does not correspond to the first stream.

The inventors realized that for some applications it may be sufficient to determine whether a data stream corresponds sufficiently to another known data stream. They realized that in some applications it may be sufficient to determine that two streams may be equal with some degree of certainty. Such information may be used to trigger more extensive (and possibly expensive) processing of the streams to determine correspondence or equality.

Figure 2C:
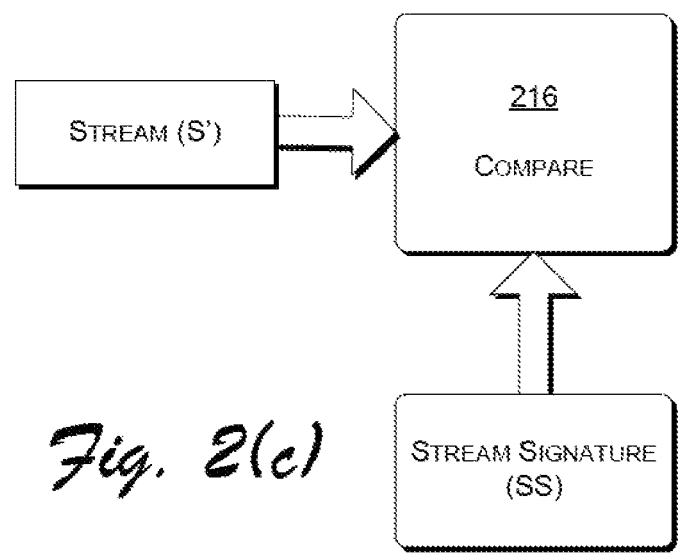
Figure 2B:
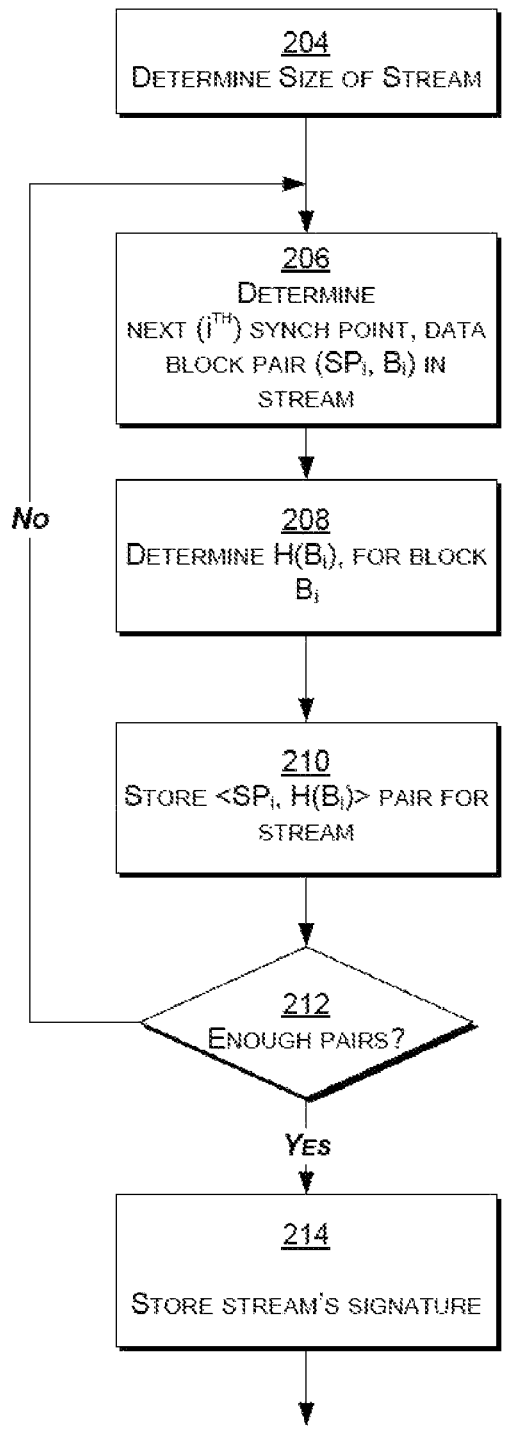
Figure 2D:
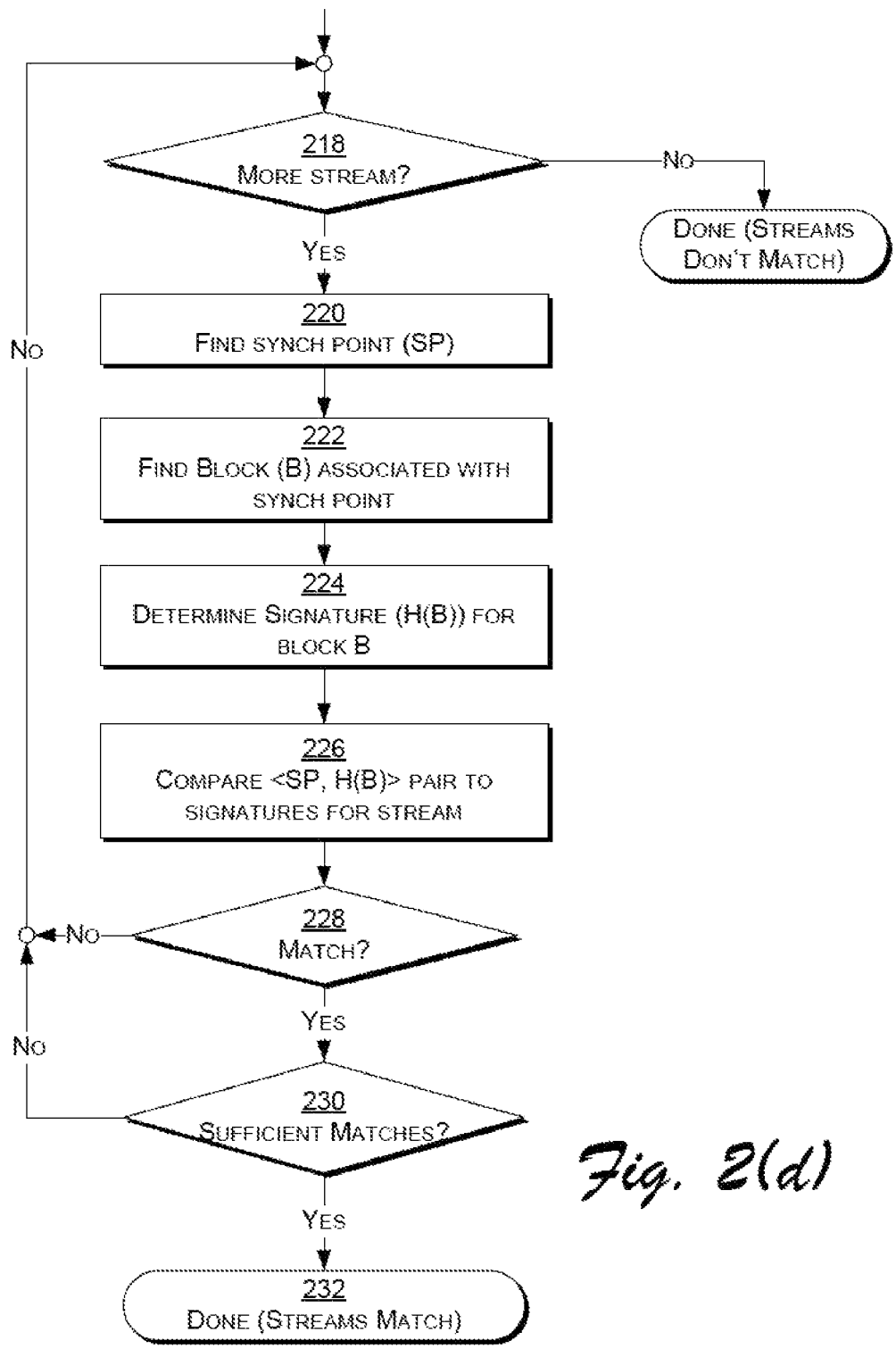

With reference now to FIG. 2(c), having determined and stored a signature (SS) for a stream S, an arbitrary stream can be processed to determine if it corresponds sufficiently to the stream S. Stream S' is provided to the compare process 216 (described below with reference to FIG. 2(d)), which uses the previously stored stream signature (SS) to determine whether or not the input stream S' corresponds to the stream S.

The compare process 216 determines whether there is any more stream to process (at 218). If not then no match has been found and so the streams do not match. If there is more of the input stream to process then the process looks for a synch point (at 220). It should be appreciated that the process will look for any of the synch points (SP) in the stream signature SS, and does not need to look for them in order. As will be apparent to those of skill in the art, upon reading this description, this allows the input stream to be processed in pieces or packets which may arrive at the compare process 216 out of order.

Having found a synch point (SP), the compare process 216 then finds the corresponding block of bits (B) associated with that synch point (at 220) and determines the signature H(B) for the block of bits B. Those of skill in the art will realize and understand, upon reading this description, that the function H used in the compare process 216 must be the same as the function that was used to generate the stream signatures.

Next (at 226) the pair <SP, H(B)> is compared to the corresponding pair for the synch point SP in the stream signature SS. If the pair does not match (at 228) the remainder of the stream (if any) is processed (at 218, . . . ). On the other hand, if (at 228) the pair <SP, H(B)> does match the corresponding pair for the synch point SP in the stream signature SS, then (at 230) the compare process 216 determines whether there have been sufficient pair matches to consider the streams to match. The test for "Sufficient matches" (at 230) may use a count of the number of matches in the stream so far and may use that count value to determine a percentage match of the <synch point, block signature> pairs for the stream signature. In some preferred implementations, a 70% match (e.g., seven out of ten matches) is considered sufficient matches to consider the streams matching (at 232). Those of skill in the art will realize and understand, upon reading this description, that the percentage match required (up to and including 100%) is a function of the accuracy required by the compare process. Since, as explained above, the compare process 216 may be used to trigger additional (and more costly comparisons) when a match is found (at 232), the person of skill in the art will know and understand how to trade off false positive matches (at 232) with the cost of subsequent processing of sufficiently matching streams.

Thus far we have described comparing and possibly matching an input stream (S') to a single previously-processed stream (S). In some embodiments an input stream may be compared to more than one previously processed stream.

The diagram in FIG. 3(a) shows a logical organization 300 of a plurality (k) of stream signatures, one stream signature for each of k streams S1, . . . Sk. Each of the stream signatures may be determined as described above with reference to FIGS. 2(a)-2(b).

The process of comparing an arbitrary input stream (S) to each of these k streams is now described with reference to FIGS. 3(a)-3(b) and 4(a)-4(b). The compare process for one stream compared to multiple possible streams may find synch points for multiple stream signatures in the input stream, and it may also find matching <synch point, hash value> pairs for more than one signature. In summary, the process preferably tracks the number of matching <synch point, hash value> pairs it finds for each of the k streams (S1 . . . Sk), and declares a match between the input stream S and the first of the k streams to sufficient matches (based on some predetermined threshold for sufficiency, as discussed above).

Figure 4B:
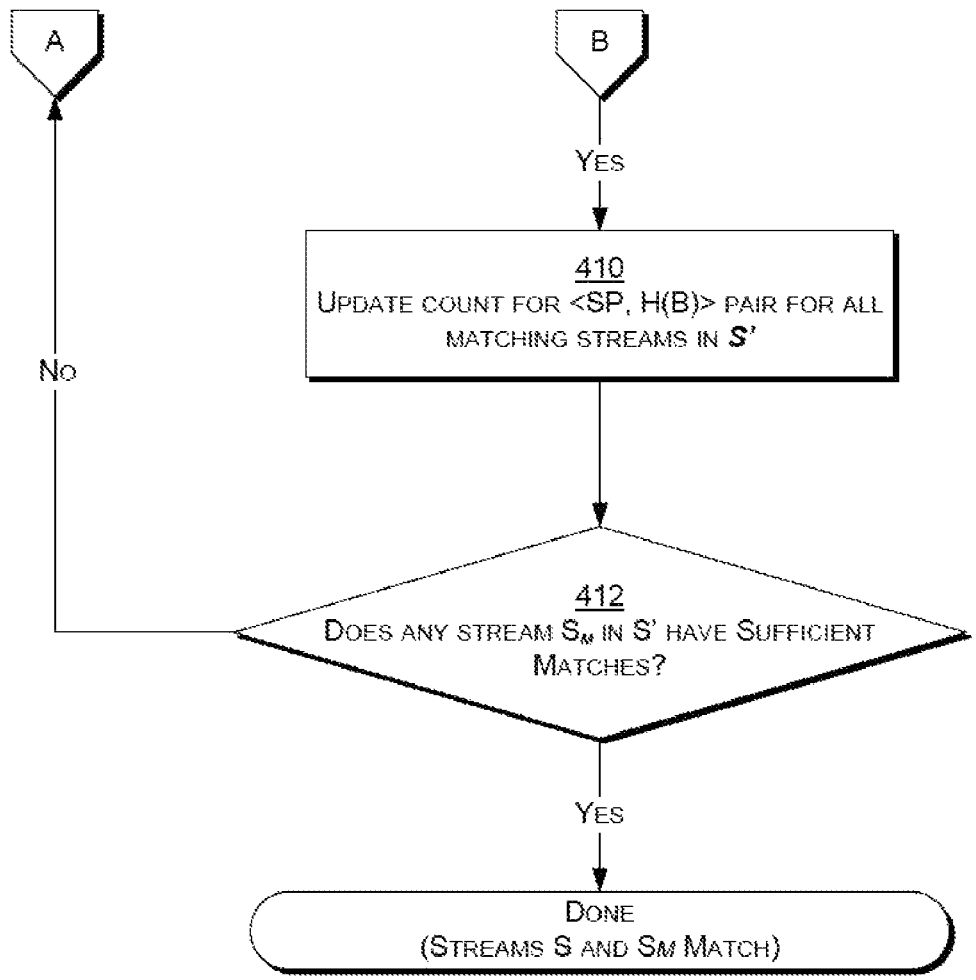

With reference to the flowchart in FIGS. 4(a)-4(b), if there is more of the stream S to process (at 400), processing continues (at 402) to look for a synch point (SP) in S that corresponds to at least one of the synch points for one of the streams S1 . . . Sk. In the flowchart the streams S1 . . . Sk are referred to as a set of streams denoted S'. If no synch point is found (at 402), then processing continues (at 400) to process any remaining part of the input stream S. If (at 402) a synch point (SP) is found in S corresponding to any of the streams S1 . . . Sk (i.e., the set of streams S'), the processing continues (at 404) to determine the corresponding signature H(B) for the block of bits B associated with the found synch point (SP).

Next (at 406), the signature pair <SP, H(B)> is compared to the signatures for all of the streams in S' associated with the synch point SP (where SP is the synch point found in S that corresponds to at least one of the synch points in at least one of the streams S1 . . . Sk; and H(B) is the signature of the block of bits B corresponding to the synch points SP). With reference again to FIG. 3(a), the stream signature for each of the streams S1 . . . Sk is stored and available to the process, so that the <synch point, signature> pairs may be checked.

If no matching signature pair is found for the pair <SP, H(B)> for any of the streams in S' (at 408), then processing continues (at 400) to process any remaining part of the input stream S. If one or more matching pairs <SP, H(B)> are found (at 408), the processing continues (at 410), where the count for <SP, H(B)> pair for all matching streams in S'

Once the counts are updated (in 410), the process determines (at 412) if any of the streams ($S_m$) in S' has sufficient matching pairs. If it is determined (at 412) that no stream in S' has sufficient matching pairs, then processing continues (at 400) to process any remaining part of the input stream S. If any stream $S_m$ does have sufficient matching pairs, the processing is done (at 414) and the input stream S is considered to match the stream(s) which had sufficient matching pairs.

It should be appreciated that the process described above may result in the input stream S matching more than one stream in the set S'.

In some implementations, a data structure 302 (FIG. 3(b)) maintains a checklist for each stream signature, so that the process may mark off (or check) each time a <synch point, signature> pair matches for that stream. That list allows the system to determine (e.g., count) the number of matching pairs for that stream. Those of skill in the art will realize and understand, upon reading this description, that the checklist may be implemented in any number of ways, including, e.g., as a bit map with one bit for each of the corresponding <synch point, signature> pairs. At the start of processing an input stream, all bits in the checklist are set to zero, and as matches are found, the corresponding bit values are set to one. The sum of the bits in the bitmap checklist for a stream Sj will then give the number of matching pairs in the input stream for that stream Sj. As will be appreciated, different and/or other schemes may be used to track the number of matches.

Those of skill in the art will realize and understand, upon reading this description, that the use of the term "match" (or "matching") with respect to two streams here does not necessarily imply that they are identical. Two streams match if a sufficient number of <synch point, signature> pairs for those streams are the same.

As previously discussed, those of skill in the art will realize and understand, upon reading this description, that different measures of sufficiency may be used to determine if two streams have sufficient matches. In some embodiments a 70% match will be considered sufficient, whereas in others higher matches (up to 100%) may be required. Those of skill in the art will realize and understand, upon reading this description, how to select a measure of matching sufficiency, based, e.g., on the application of the process and the tolerance for false positive matches. As noted earlier, in some applications, once two streams are found to match by the process described here, further tests may be used to determine if the streams match.

Data Structures and Implementations

Those of skill in the art will realize and understand, upon reading this description, that various optimizations may be applied to implementing the matching process. The data structures should preferably be:

Scalable: Should handle initially 100s to Millions of entries with the option to grow if needed.

Memory efficient: Should use as little memory as possible

Search efficient: The search for a given pattern should not exceed O(n).

An exemplary data structure for implementations of the stream matching process is described with reference to FIG. 5. For this example, assume that each synch point is a sequence of six to eight bytes, and each fingerprint is a two-byte long value. Additional (optional) data may also be stored in the data structures. With reference to FIG. 5, the data structure (referred to as the Synch fingerprinting data structure (SFDS)) comprises of a set of arrays:

row 1—a 256-bit long array, where each bit corresponds to an ASCII code (to a code that can appear in a synch point)

row2—a $256^2$ bits long array, with 256 bits related to each of the bits in row 1 row3—a $256^3$ bits long array, with 256 bits related to each of the bits in row3 row4—a list of trees that correspond to specific entries in row3

In an initialization process, pairs of synch points (a sequence of 6-8 bytes) and fingerprints (a 2 bytes long hash value with an additional optional set of data) are stored in the data structure as follows:

1. The 1st byte of the synch will set the relevant bit in row1 (if it was not set yet).

2. The 2nd byte of the synch will set the relevant bit in the 256 bits of row2 that are related to the bit that was set in row1 (if it was not set yet).

3. The 3rd byte of the synch will set the relevant bit in the 256 bits of row3 that are related with the bit that was set in row2 (if it wasn't set yet).

4. The rest of the synch bytes are stored in a tree that corresponds to the bit set at step 3. (The tree will be created if it did not already exist.)

5. The fingerprint and any additional data are connected to the relevant leaf of the tree from step 4 above.

EXAMPLE

The following example shows the use of the exemplary data structures described above (in FIG. 5). With reference now to the drawings in FIGS. 6(a)-6(c), consider a stream with the synch point SP1="2, 254, 1, A, A, C" (the pattern is shown here in ASCII) with a corresponding fingerprint value 0x23a9. It will be appreciated that this means that the hash of the block of bits associated with the synch point SP1 is 0x23a9. For the sake of this example, assume that the stream has a stream id of 1000 and a synch index of 5.

This pair <"2, 254, 1, A, A, C", 0x23a9> may be added to the data structure as follows:

1. The first character in the synch point is "2", so set bit 2 in row1 to 1
2. The second character in the synch point is 254, so set bit 254 of the 256 bits of row2 that correspond with bit 2 of row1 to 1. That is, set row2[2][254] to 1.
3. The third character in the synch point is 1, so set the 1st bit of the 256 bits of row3 that correspond with the bit that was set in step 2. That is, set row3[2,254][1] to 1.
4. Assuming the bit that was set in step 3 already has a tree that corresponds with it and that tree already has an 'A' as a first character there is nothing to do with the 'A' (the fourth character in the synch point).
5. The fifth character in the synch point is also an 'A'—add it to the tree as a second letter.
6. The sixth character in the synch point is a 'C', so add it to the tree as a third letter and create a new empty leaf bellow it.
7. Store the fingerprint value (0x23a9) and the additional data (Stream id 1000 and synch index 5) in a record and associate it with the leaf that was created in step 6.

Figure 6A:
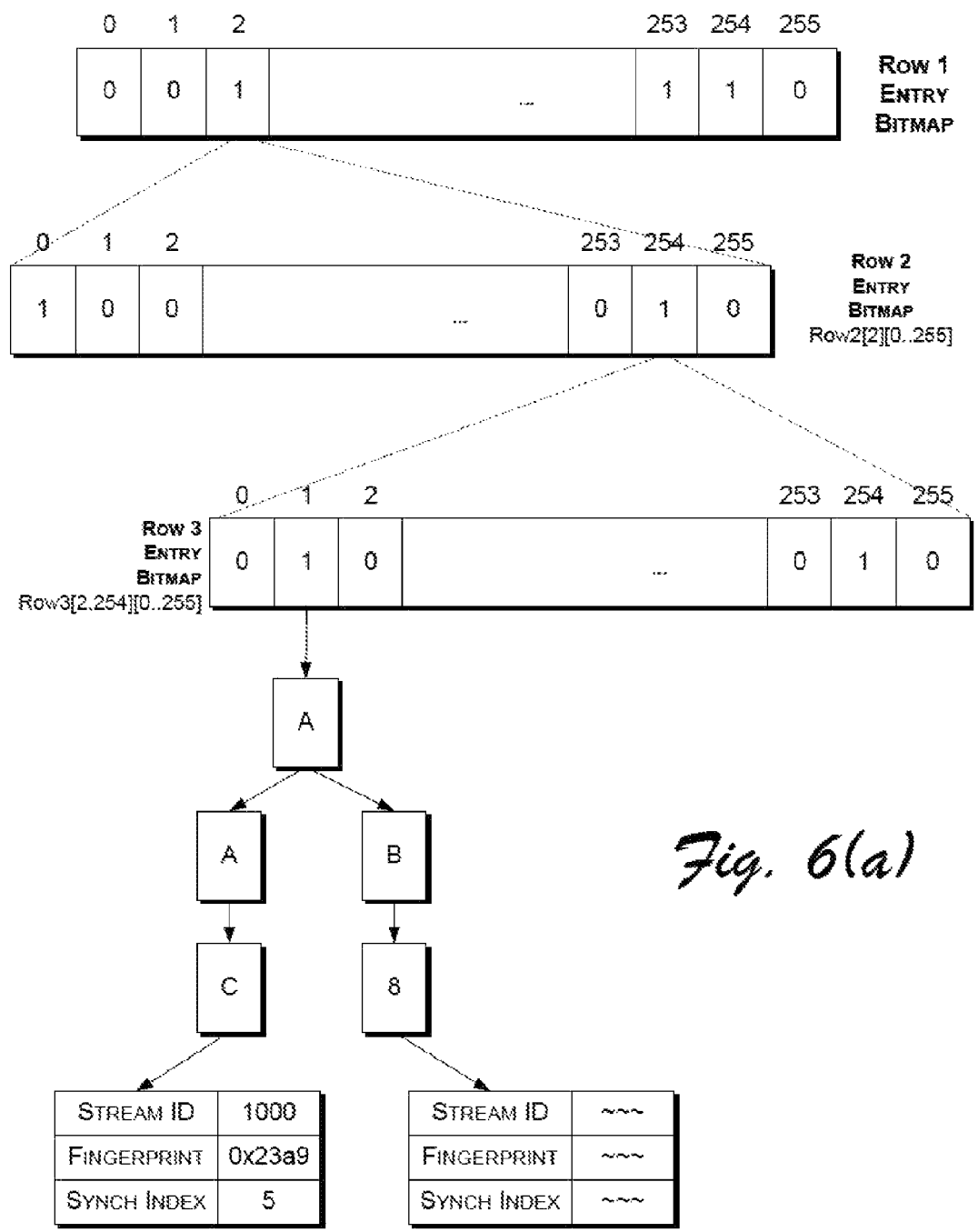

Once the data structures are set up (as described above), an input stream can be processed, e.g., as described here with reference to FIGS. 6(a)-6(c). The matching process uses two auxiliary data structures, namely a Match Synch List (MSL) data structure (FIG. 6(b)) and a Match signature list of vectors (MSLoV) data structure (FIG. 6(c)).

The Match sync List (MSL) structure is a list with up to n entries (where n is the length of a synch). In this example the synch length is eight and the MSL has eight entries. The list holds the addresses (SFDS, FIG. 5) of the synchs that are being processed. Entry i of the vector holds the address of a synch for which the first i bytes matched a synch in the SFDS and its (i+1)th byte was not yet compared. A value of −1 stands for "no match" in that length.

The Match signature list of vectors (MSLoV) structure is a list of vectors. Each vector in the MSLoV list holds the list of synchs that match synchs of a given stream and the stream id of that stream. The j$^{th}$ entry of the vector holds the synch index (taken from the SFDS) of the j$^{th}$ synch found to be matching a synch of that stream.

The search flow using these data structures is as follows:

1. Each time a new packet is read, all the bytes in that packet are scanned byte by byte. Each byte is compared with the bytes in row1 of the SFDS. If there is a match then entry 1 of MSL is set to the section of SFDS's row2 that relates to the relevant entry in SFDS's row1.
2. A byte that follows a byte that had a match is compared several times. Assuming the previous byte is the i-th in a match then the current byte will be checked i times (the checks are done in the reverse order of the following description. That is first the check in step e is done, then the check in d, then . . . and the final one is the one described in step a):
   a. As the first in a match (as described in step 1)
   b. As a second byte in a match starting with the partial synch pointed by entry 1 of the MSL—the match is checked against the relevant section of SFDS's row2 that is pointed by MSL's entry 1. If a match is found than entry 1 is set to "−1" and entry 2 is updated with the address of the partial match found so far (that is the relevant entry in SFDS's row2).
   c. As a third byte in a match starting with the partial synch pointed by entry 2 of the MSL—the match is checked against the relevant section of SFDS's row3 that pointed by MSL's entry 1. If a match is found than entry 2 is set to "−1" and entry 3 is updated with the address of the partial match found so far (that is the relevant entry in SFDS's row2)
   d. . . .
   e. As the ith byte in a match starting with the partial synch pointed by entry i-1 of the MSL—the match is checked against the relevant section of SFDS that is pointed by MSL's entry i-1. If a match is found than entry i-1 is set to "−1" and entry i is updated with the address of the partial match found so far (that is the relevant entry in SFDS)
3. Each time a full synch found (that is i in step 2 equals the length of a full synch and step 2.e is successful), the fingerprint is calculated. The calculated fingerprint is compared with the fingerprint pointed by SFDF's tree leaves that are pointed by the SFDF section in MSL's last entry. If a matching fingerprint is found then its stream Id and Synch Index are taken and MSLoV is updated:
   a. If MSLoV does not have a vector for that stream Id then a new one is created and added to the beginning of MSLov. The Stream Id of the new vector is set to the stream Id that was taken from SFDS. Entry 1 of the new vector is set to Synch Index that was taken from SFDS.
   b. If MSLoV already has a vector for that stream Id then it's first vacant entry is set to Synch Index that was taken from SFDS.
   c. Note that if the matching synch has several leaves in MSLoV that steps a/b above are done separately for each of these leaves.
4. Once the number of indexes in a MSLoV vector exceeds a given amount (e.g., 8 out of 10) a match between the input flow and the stream which id is stored by the stream Id of that vector is defined.
5. Note that only an portion with a predefined length of the flow is searched for Synchs. If the search exceeds that portion with identifying a matching stream it is assumed to be an unknown stream and both MSL and MSLoV are cleared.

END EXAMPLE

Those of skill in the art will realize and understand, upon reading this description, that different and/or other data structures may be used to implement the processes described here. It should be appreciated that some efficiency is preferred with respect to the data structures used. As objective, the data structure should store up to 1 million synch points (6-8 bytes each) with the fingerprints related to each of the synch patterns. As noted, the data structure is preferably created off line ahead of time (it will be prepared for an initial set of data and then updated incrementally whenever needed) while the search itself will be done in real time.

Using the data structures described in the example above (FIGS. 6(a)-6(c)), for one million synch entries:

The first 3 bytes will be added to 3 lines each of 256 entries (3 times $2^8$ equal $2^{24}$ equal to 16 million entries). The next bytes will be unique added to the last row of each prefix (less than 1% will have the same prefix and a list structure will be efficient enough, if not, a different synch pattern may be considered for the new added stream).

Adding a new synch is done off line and its in order of the synch length

Searching for a synch in the data structure can be done real time and is in the order of the synch length O(l).

Packetized Data Streams

In some cases the input stream of data may be in the form of packetized data. This may occur, for example, if the comparison processing is taking place in a device such as a router. In such cases, the device performing the processing may need to buffer payload data from more than one packet in order to perform the processing.

As is well known, in a packet-based network (such as a TCP/IP network, e.g., the Internet) data to be sent from one location to another are packetized (split into multiple packets). With reference to FIG. 7, a typical packet includes address information and payload. The payload comprises the data to be transmitted, and the address information includes information that allows the network to route the packet to its destination. Those of skill in the art will realize and understand, upon reading this description, that many forms of packetizing may be used, and the form and type of packets are not limiting to the invention. In addition, it should be appreciated that some networks may use multiple levels of protocols, so that a payload may itself be a packet that includes other address information. Regardless of the protocol(s) used, those of skill in the art will know how to extract data corresponding to a data item from a particular packet.

If the kind of packetizing is known in advance, it is preferable to select synch points such that each synch point fits within the payload of a single packet. However, since this may not be possible, it may be necessary to obtain and buffer the payloads of multiple sequential packets in order to perform the processing described above (looking for synch points and then processing their corresponding blocks of bits).

Those of skill in the art will realize and understand, upon reading this description, that the process and system described supports a comparison between two content streams much faster and in a more efficient way comparing to currently used approaches. In addition, the approach described herein can handle encrypted contents.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 8:
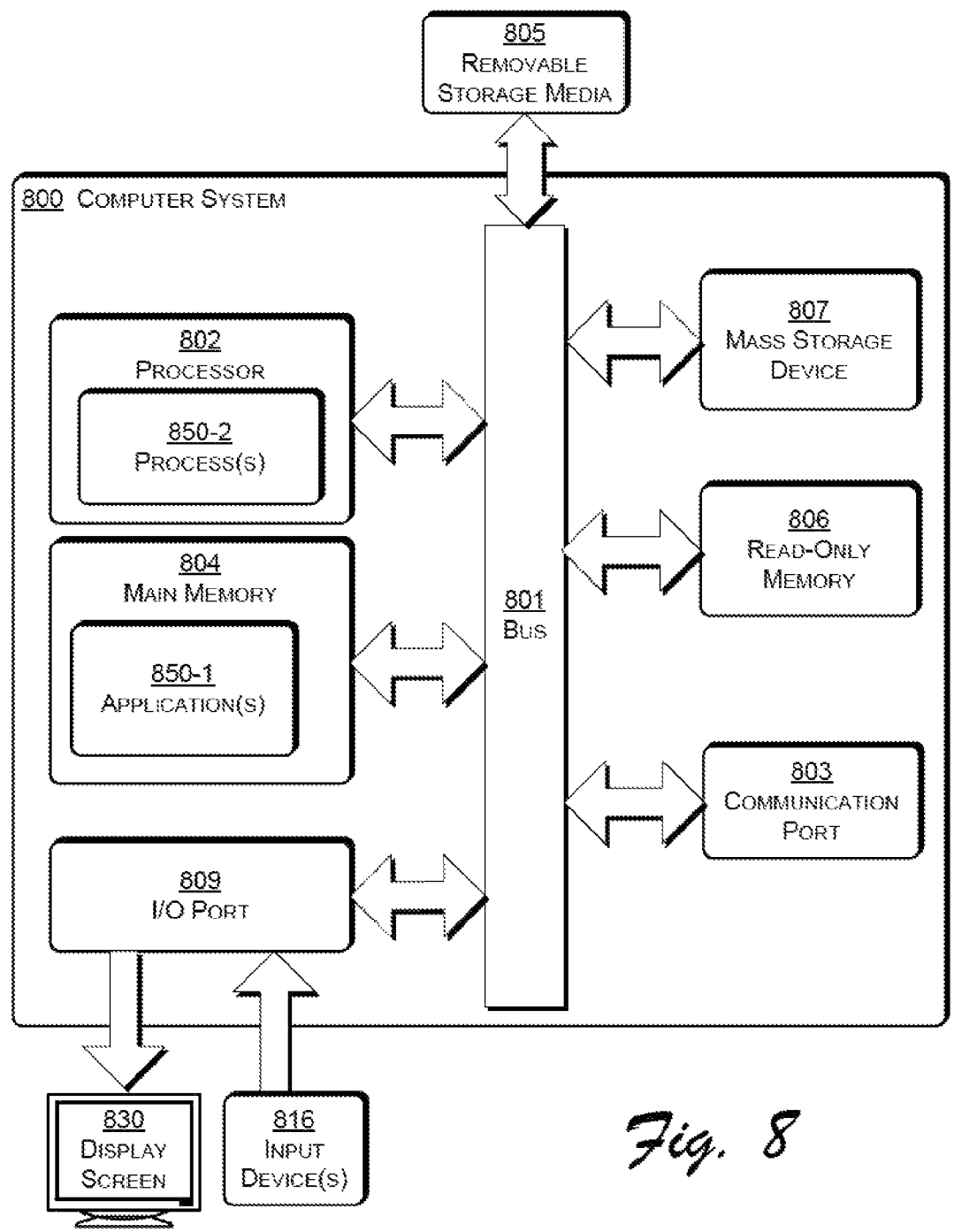
FIG. 8 is a schematic diagram of a computer system.

FIG. 8 is a schematic diagram of a computer system 800 upon which embodiments of the present disclosure may be implemented and carried out.

According to the present example, the computer system 800 includes a bus 801 (i.e., interconnect), at least one processor 802, at least one communications port 803, a main memory 804, a removable storage media 805, a read-only memory 806, and a mass storage 807.

Processor(s) 802 can be any known processor, such as, but not limited to, an Intel® Itanium® or Itanium 2® processor(s), AMD® Opteron® or Athlon MP® processor(s), or Motorola® lines of processors, and the like. Communications port(s) 903 can be any of an RS-232 port for use with a modem based dial-up connection, a 10/100 Ethernet port, a Gigabit port using copper or fiber, or a USB port, and the like. Communications port(s) 803 may be chosen depending on a network such as a Local Area Network (LAN), a Wide Area Network (WAN), a CDN, or any network to which the computer system 800 connects. The computer system 800 may be in communication with peripheral devices (e.g., display screen 830, input device(s) 816) via Input/Output (I/O) port 809.

Main memory 804 can be Random Access Memory (RAM), or any other dynamic storage device(s) commonly known in the art. Read-only memory 806 can be any static storage device(s) such as Programmable Read-Only Memory (PROM) chips for storing static information such as instructions for processor 802. Mass storage 807 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 801 communicatively couples processor(s) 802 with the other memory, storage and communications blocks. Bus 801 can be a PCI/PCI-X, SCSI, a Universal Serial Bus (USB) based system bus (or other) depending on the storage devices used, and the like. Removable storage media 805 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 804 is encoded with application 850-1 that supports the functionality as discussed herein (the application 850-1 may be, e.g., the initial setup 200 or the compare application 216). Application 850-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 802 accesses main memory 804 via the use of bus 801 in order to launch, run, execute, interpret or otherwise perform the logic instructions of the application 850-1. Execution of application 850-1 produces processing functionality in process 850-2. In other words, the process 950-2 represents one or more portions of the application 850-1 performing within or upon the processor(s) 802 in the computer system 800.

It should be noted that, in addition to the process 850-2 that carries out operations as discussed herein, other embodiments herein include the application 850-1 itself (i.e., the un-executed or non-performing logic instructions and/or data). The application 850-1 may be stored on a computer readable medium (e.g., a repository) such as a disk, hard disk or in an optical medium. According to other embodiments, the application 850-1 can also be stored in a memory type system such as in firmware, read only memory (ROM), or, as in this example, as executable code within the main memory 804 (e.g., within Random Access Memory or RAM). For example, application 850-1 may also be stored in removable storage media 805, read-only memory 806, and/or mass storage device 807.

Example functionality supported by computer system 800 and, more particularly, functionality associated with application 850-1 is discussed above with reference to FIGS. 2(a)-2(d) and 4(a)-4(b).

Those skilled in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

It should be appreciated that the words "first" and "second" in the claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, implemented by hardware in combination with software, the method comprising:
   determining a plurality of synch points in a data stream, the data stream consisting of an arbitrary sequence of bits, and each synch point consisting of a sequence of bits in the data item;
   for each of the plurality of synch points, determining a corresponding block of bits in the data stream, wherein a plurality of the blocks of bits consists of fewer than all of the bits between two adjacent synch points in the data stream;
   for each block of bits, determining a corresponding block signature by applying a hash function or message digest function to the block of bits; and
   forming a data stream signature by associating each of the plurality of synch points with the corresponding block signature of the corresponding block of bits, wherein said associating forms an ordered sequence of corresponding synch point and block signature pairs, wherein said data stream signature is based on fewer than all of the bits in the data stream.

2. The method of claim 1 wherein the corresponding block of bits of each particular synch point is directly adjacent to the particular synch point in the data stream.

3. The method of claim 1 wherein the hash function is selected from the functions comprising: SHA and MD5.

4. The method of claim 1 wherein each synch point consists of 32 bits.

5. The method of claim 1 wherein each block of bits consists of 256 bytes.

6. A device comprising hardware and software for implementing a method comprising:
   determining a plurality of synch points in a data stream, the data stream consisting of an arbitrary sequence of bits, and each synch point consisting of a sequence of bits in the data stream;
   for each of the plurality of synch points, determining a corresponding block of bits in the data stream, wherein a plurality of the blocks of bits consists of fewer than all of the bits between two adjacent synch points in the data stream, and wherein the bits comprising (a) the plurality of synch points, and (b) the plurality of blocks of bits comprise fewer than all of the bits in the data stream;
   for each block of bits, determining a corresponding block signature by applying a hash function or message digest function to the block of bits;

forming a data stream signature by associating each of the plurality of synch points with the corresponding block signature of the corresponding block of bits, wherein said associating forms an ordered sequence of corresponding synch point and block signature pairs.

7. A computer-implemented method, implemented by hardware in combination with software, the method comprising:

(A) obtaining a first data stream signature for a first data stream, the first data stream signature comprising an association between a plurality of synch points in the first data item and a corresponding plurality of block signatures, wherein said association comprises an ordered sequence of corresponding synch point and block signature pairs, and wherein, for a particular pair comprising a particular synch point and a particular block signature, the particular block signature associated with the particular synch point was determined by applying a hash function or message digest function to a corresponding particular block of bits associated with the particular synch point, and wherein said data stream signature is based on fewer than all of the bits in the data stream;

(B) attempting to find a synch point of the plurality of synch points in a second data stream; and (C) if a synch point of the plurality of synch points is found in the second data stream, then:

(C)(1) determining a block signature of a block of bits in the second data item corresponding to the particular synch point, wherein the block signature is determined by applying a hash function or message digest function to the block of bits in the second data item corresponding to the particular synch point; and (C)(2) ascertaining whether or not the particular synch point and the corresponding block signature from the second data item correspond to a synch point and block signature pair in the first data stream signature; and (C)(3) when the particular synch point and the corresponding block signature from the second data item correspond to a synch point and block signature pair in the first data stream signature, maintaining information indicative of the correspondence;

(D) repeating steps (B) and (C) while at least some of the second data item remains unprocessed, until a predetermined number of synch points and corresponding block signatures from the second data item match synch points and corresponding block signatures in the first data stream signature;

(E) indicating a match between the first data stream and the second data item when the predetermined number of synch points and corresponding block signatures from the second data item match synch points and corresponding block signatures in the first data stream signature.

8. The method of claim 7 wherein steps (B) and (C) are repeated in parallel for multiple different portions of the second data stream.

9. The method of claim 7 further comprising:

(F) in the event of a match between the first data stream and the second data item, as determined in (E), selectively denying access to the second data item.

10. The method of claim 7 further comprising:

(G) in the event of a match between the first data stream and the second data item, as determined in (E), maintaining information about the second data item.

11. The method of claim 10 where the at least some of the processing takes place in a particular device, and wherein the information maintained includes information about the particular device.

12. The method of claim 11 wherein the device is a router in a network.

13. The method of claim 7 further comprising:
obtaining a plurality of packets; and
extracting payload information from the plurality of packets to obtain at least some of the second data item.

14. The method of claim 7 further comprising:

(H) in the event of a match between the first data stream and the second data item, as determined in (E), subjecting the second data item to additional checking to determine if it is the same as the first data stream.

15. The method of claim 7 wherein the corresponding block of bits of each particular synch point is directly adjacent to the particular synch point.

16. The method of claim 7 wherein the hash function is selected from the functions comprising: SHA and MD5.

17. The method of claim 7 wherein each synch point consists of 32 bits.

18. The method of claim 7 wherein each block of bits consists of 256 bytes.

19. A computer-implemented method, implemented by hardware in combination with software, the method comprising:

(A) obtaining a plurality of data stream signatures, at least one signature for each of a plurality of data items, the data item signature for each particular data stream of the plurality of data streams comprising an association between a plurality of synch points in the particular data stream and a corresponding plurality of block signatures for a corresponding plurality of blocks of bits in the particular data stream, wherein said association for a particular data stream comprises an ordered sequence of a plurality of corresponding synch point and block signature pairs, wherein a plurality of the blocks of bits consists of fewer than all of the bits between two adjacent synch points in the particular data stream, and wherein the bits comprising (a) the plurality of synch points, and (b) the plurality of blocks of bits comprise fewer than all of the bits in the particular data stream;

(B) attempting to find a synch point of the plurality of data stream signatures in a second data item; and (C) if a synch point of the plurality of data stream signatures is found in the second data item, then:

(C)(1) determining a block signature of a corresponding block of bits in the second data item, wherein the block signature is determined by applying a hash function or message digest function to the corresponding block of bits in the second data item; and (C)(2) ascertaining whether or not the synch point and the corresponding block signature of the second data item correspond to a synch point and block signature in any of the plurality of data stream signatures; and (C)(3) when the synch point and the corresponding block signature of the second data item correspond to a synch point and block signature in one or more of the plurality of data stream signatures, maintaining information indicative of the correspondence;

(D) repeating steps (B) and (C) while at least some of the second data item remains unprocessed, until a predetermined number of synch points and corresponding block signatures from the second data item match synch points and corresponding block signatures in at least one of the plurality of data stream signatures;

(E) when a predetermined number of synch points and corresponding block signatures from the second data item match the predetermined number of synch points and block signatures in a first data stream signature of the plurality of data streams, indicating a match between the first data stream and the second data item.

20. The method of claim 19 wherein the corresponding block of bits of each particular synch point is directly adjacent to the particular synch point.

* * * * *